March 18, 1969   H. FEIGHOFEN   3,433,514
EXPANSIBLE CONNECTOR
Filed Oct. 13, 1966   Sheet 1 of 2
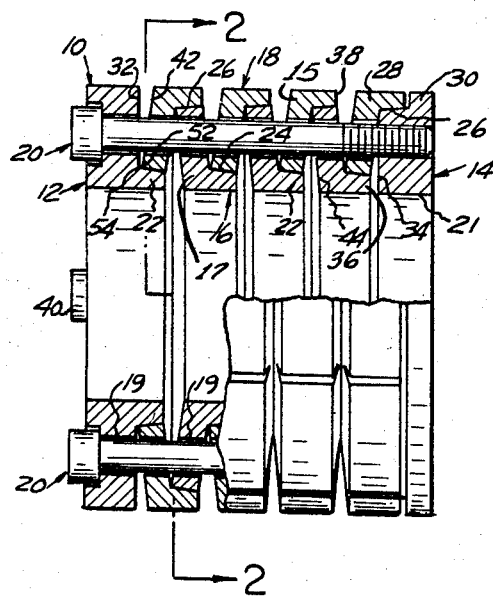
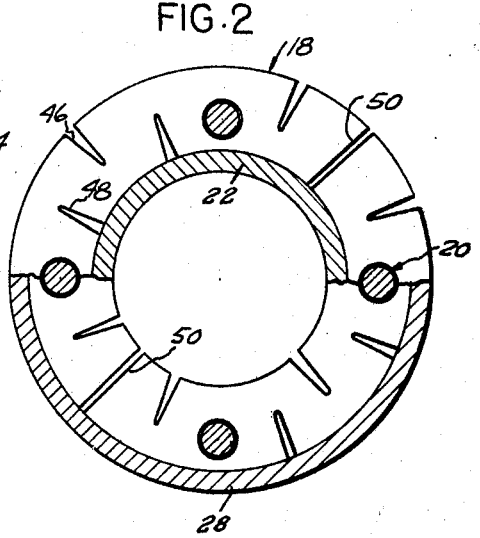
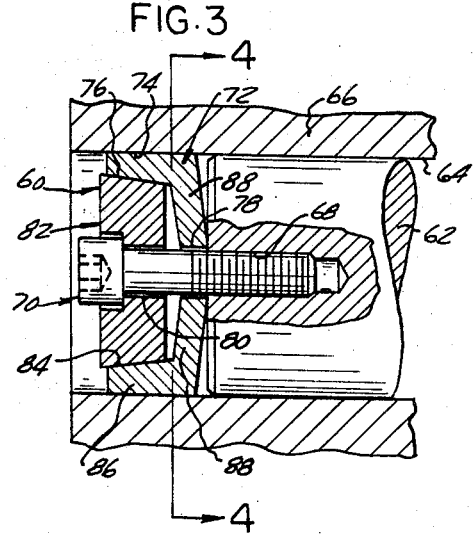
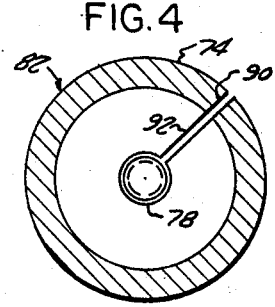
INVENTOR
HANS FEIGHOFEN
BY *Barthel & Bugbee*
ATTORNEYS March 18, 1969  H. FEIGHOFEN  3,433,514
EXPANSIBLE CONNECTOR Filed Oct. 13, 1966

INVENTOR
HANS FEIGHOFEN

BY Barthel + Bugbee
ATTORNEYS

United States Patent Office 3,433,514
Patented Mar. 18, 1969

3,433,514
EXPANSIBLE CONNECTOR
Hans Feighofen, Herdringen, Germany, assignor to
John Haller, Northville, Mich.
Filed Oct. 13, 1966, Ser. No. 586,512
U.S. Cl. 287—124                                     3 Claims
Int. Cl. F16b 7/00; F16d 1/00; F16l 21/00

ABSTRACT OF THE DISCLOSURE

A double-acting expansible connector possessing a combined tilting and wedging action consists of an expanding device and an expanded device disposed adjacent one another and having aligned holes through which an elongated axial-force-exerting contrivance extends. These devices have interengaging wedging surfaces inclined relatively to said contrivance and responsive to the imposition of axial force thereon by said contrivance for expanding the expanded device in a direction transverse to the axis of the axial-force-exerting contrivance. The expanded device has a web portion containing its respective hole and inclined relatively to the axis of the axial-force-exerting contrivance and also has at one edge thereof a flange projecting axially from the web portion at an obtuse angle thereto.

Summary of the invention

The above abstract relates to the construction of an expansible connector which in the form shown in FIGURES 3 and 4 operates by a combined wedging and tilting action in a toggle-joint manner for urging the expanded device outward into gripping engagement with one of the structural parts to be connected to another structural part into which the axial-force-exerting contrivance or adjusting screw is threaded. In the form shown in FIGURES 1 and 2, this combined tilting and wedging or toggle-joint action is exerted both inward and outward in an annular path. In the form shown in FIGURES 5 and 6, the expanding and expanded devices consist of elongated bars wherein the combined tilting and wedging action is exerted in opposite directions perpendicularly to the axis of the axial-force-exerting contrivance or adjusting screws.

Background of the invention

Hitherto, expansible connectors have been provided which employ rings manufactured from spring steel by metal cutting processes and equipped with interengaging external and internal conical surfaces. These prior devices, however, are very expensive to manufacture as they require cutting, hardening and grinding. Furthermore, the expansibility of these prior devices is very limited, such as those using cylindrical-shaped parts with alternating internal and external projecting portions forming a waveshaped unit with cylindrical contact surfaces.

In the drawings,

FIGURE 1 is a central vertical section, partly in side elevation, of a double-acting expansible connector, according to one form of the invention;

FIGURE 2 is a vertical cross-section, taken along the zig-zag line 2—2 in FIGURE 1;

FIGURE 3 is a central vertical section partly in side elevation, of a modified double-acting expansible connector;

FIGURE 4 is a cross-section, taken along the line 4—4 in FIGURE 3;

Figure 5:
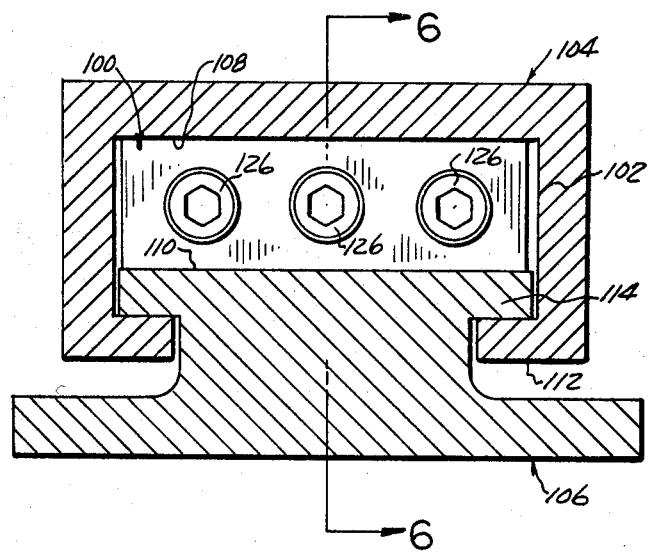
FIGURE 5 is a cross-section, partly in front elevation, of a further modification of the invention, for interconnecting tongued-and-grooved machine elements.

Referring to the drawings in detail, FIGURES 1 and 2 show a double-acting expansible connector, generally designated 10, particularly adapted for connecting a shaft to an enlarged bore (not shown) and consisting generally of a forward ring 12, a rearward ring 14, inner intermediate rings 16, outer intermediate rings 18, and adjusting screws 20 extending therethrough for varying the expansibility of the connector 10. The forward ring 10 and the webs 17 and 15 respectively of the inner and outer intermediate rings 16 and 18 are drilled to provide enlarged holes 19 with clearances to allow relative motion between them and the smooth shanks of the screws 20, and the holes in the forward ring 12 are counterbored to partly countersink the heads of the adjusting screws 20. The rearward ring 14 is drilled and threaded to threadedly receive the threaded portions of the screws 20. In other words, the shanks of the screws 20 pass loosely through the rings 12, 16 and 18 to their threaded connections with the rearward ring 14. The forward and rearward rings 12 and 14 and the inner intermediate rings 16 are provided with central coaxial bores 21 to fit a machine element, such as a shaft, inserted therein.

The forward ring 12 and inner intermediate rings 16 are provided with externally conical axially rearwardly projecting annular flanges 22 which matingly engage internally conical surfaces 24 within the outer intermediate rings 18. The inner intermediate rings 16 and the rearward ring 14 are provided with external conical surfaces 26 which mate with internally conical flanges 28 on the outer intermediate rings 18. The forward and rearward rings 12 and 14 and the outer intermediate rings 18 are provided with external cylindrical surfaces 30 of the same diameters in one position of adjustment of the connector 10. The rearward surfaces 32 of the forward ring 12, the forward surface 34 of the rearward ring 14, and the rearward surfaces 36 and 38 of the web 15 of the intermediate rings 16 and 18 are radial surfaces in that they are disposed in planes perpendicular to the axis 40 of the central bore 21. The forward surfaces 42 of the webs 15 of the outer intermediate rings 18 are inclined to the axis 40 of the central bore 21 in that they are annular conical surfaces converging forwardly toward the axis 40 whereas the forward surfaces 44 of the webs 17 of the inner intermediate rings 16 are inclined rearwardly toward the axis 40, in that they are rearwardly converging conical surfaces. The outer peripheries of the outer intermediate rings 18 are provided with circumferentially spaced inwardly extending V-notches 46 (FIGURE 2) whereas their inner peripheries are provided with outwardly extending V-notches 48. The V-nitches 46 and 48 extend in opposite directions only partway through the outer rings 18 whereas these rings 18 are also provided with diametrically aligned radial slots 50 which extend entirely through the outer intermediate rings 18 in a diametral direction.

In the operation of the double-acting expansible connector 10, the operator passes the shaft or other machine element through the central bore 21 and then inserts this assembly in the bore of the other machine element to be connected to the shaft. To expand the connector 10 and tightly connect the machine elements to one another, the operator then rotates the screws 20 by means of a so-called Allen wrench inserted in the sockets on the heads of the screws 20. This action draws the forward and rearward rings toward one another, causing the outer intermediate rings 18 to tilt around their inner edges 52 at the locations 54 or circular lines where the flanges 22 join the main portions of the rings 12, 16 and 14 as fulcrums. At the same time, the external conical surfaces 26 coact with the internal conical surfaces of the flanges 28 with a sliding wedging engagement. Simultaneously with this action, the internal conical surfaces 24 on the inner peripheries of the outer intermediate rings 18 coact with the external conical surfaces on the flanges 22. The results of this double action of simultaneous tilting and wedging in a toggle-joint manner between the various rings 12, 14, 16 and 18 causes the inner intermediate rings 16 to be contracted while the outer intermediate rings 18 are expanded against their respective machine elements. The notches 46 and 48 and the slots 50 (FIGURE 2) facilitate this simultaneous expansion and contraction. As a result the machine elements are firmly connected to one another with a force which may be varied and adjusted by rotating the screws 20 inward or outward relatively to the rearward and forward rings 12 and 14.

The modified expansible connector 60 shown in FIGURES 3 and 4 is intended for the purpose of connecting a first machine element, such as a shaft 62 within the bore 64 of a second machine element or workpiece 66. For this purpose, the shaft 62 is centrally drilled and threaded at 68 to receive the correspondingly threaded shank of an adjusting screw 70 which is also preferably of the so-called Allen type. Mounted in the bore 64 of the machine element 66 is an outer ring 72 provided with an outer cylindrical surface 74 and an internal conical surface 76, together with an enlarged hole 78 through which the smooth portion of the shank of the adjusting screw 70 loosely passes with sufficient clearance to permit the maximum adjustment, as explained below. Also mounted on the smooth portion of the shank of the adjusting screw 70 and receiving the latter through a similarly enlarged 80 is an expansion plug 82 having on the rim thereof an external conical surface 84 corresponding to the internal conical surface 76 on the outer ring 72. The hole 80 is counterbored to partly countersink the head of the adjusting screw 70. As shown in FIGURE 4, the flange 86 and web 88 of the ring 72 are provided with radial connecting slots 90 and 92 respectively leading from the cylindrical peripheral surface 74 to the enlarged central hole 78 and the central portion or web 88 is inclined relatively to the axis of the adjusting screw 70 so as to provide clearance spaces between it and the portions of the inner ends of the expansion plug 82 and shaft 62, respectively.

In the operation of the modified expansible connector 60 of FIGURES 3 and 4, let it be assumed that the adjusting screw 70 has been loosened so that the plug 82 has been withdrawn to the left sufficiently to prevent wedging engagement of the internal and external conical surfaces 76 and 84, respectively. The operator then passes the shaft 62, with the expansible connector 60 attached to its forward end, through the bore 64 of the workpiece or machine element. With the parts shown in the positions indicated in FIGURE 3, the operator then inserts a suitable wrench, such as a so-called Allen wrench, into the socket in the head of the adjusting screw 70 and rotates it clockwise to cause its threaded shank to move farther into the threaded bore 68 in the end of the shaft 62.

This action forces the expanding conical plug 82 into the ring 72 so that the external and internal conical surfaces 84 and 76 thereof coact with one another to expand the flange 86 outward to cause the cylindrical peripheral surfaces 74 thereof to move into tight engagement with the surface of the bore 64 of the machine element or workpiece 66. The gripping pressure can of course be varied to the desired extent by rotating the adjusting screw 70 to move inward or outward, as the case may be.

Figure 6:
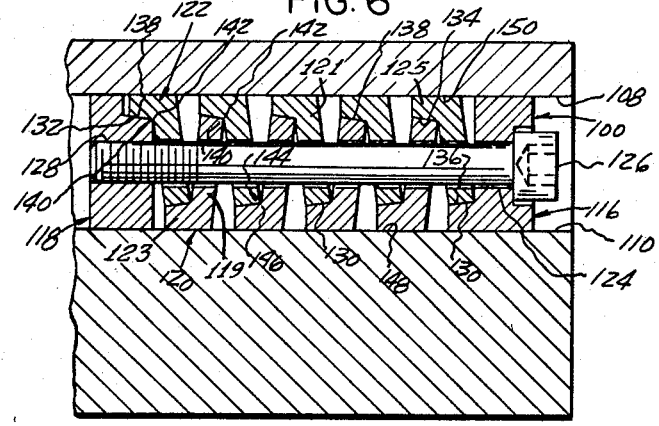
FIGURE 6 is a longitudinal section, taken along the line 6—6 in FIGURE 5.

The further modified expansible connector 100 shown in FIGURES 5 and 6 employs the double-acting expansion principle and construction of the double-acting expansible connector 10 of FIGURES 1 and 2 with a similar simultaneous double action of combined tilting and wedging to produce the expansion effect. The expansible connector 100, however, is in the approximate form of a rectangular block or occupies the space which would be occupied by a rectangular block and serves to fit into the rectangular space 102 between a channel member 104 and an I-beam or I-rail 106. The words "channel member" and "I-beam" 106 are employed merely because of the approximate resemblance of these elements to channel members of C-shaped cross-section and bars or beams of I-shaped cross-section. The elements 104 and 106 to be interconnected by the double-acting expansible connector 100 may be either machine elements, such as a slide 104 to be temporarily locked to a guide rail 106, or may be structural members or workpieces so shaped. In either case, the channel member 104 has an inner surface 108 to be connected to a surface 110 on the element 106, by means of the expansible connector 100. The channel member 104 and the guide rail 106 have mutually overhanging interengaging flanges 112 nd 114 respectively.

The expansible connector 100 includes flanged forward and rearward bars 116 and 118 respectively (FIGURE 6). It also includes inner and outer flanged intermediate bars 120 and 122 of approximately L-shaped cross-section with webs 119 and 121 and flanges 123 and 125, respectively. The bars 116, 120 and 122 are provided with enlarged bores 124 through which pass adjusting screws 126, the threaded inner ends of which threadedly engage bores 128 in the rearward bar 118. The forward and rearward bars 116 and 118 and inner intermediate bars 120 are provided with inclined wedging surfaces 130, 132 and 134 respectively which engage the correspondingly inclined surfaces 136 and 138 on the inner ends or outer flanges respectively of the outer intermediate bars 122. The inner and outer flanged intermediate bars 120 and 122 have their webs 119 and 121 tilted relatively to the axes of the adjusting screws 126 and have their flanges 123 and 125 disposed at angles of slightly greater than 90 degrees relatively to their respective webs 119 and 121 so as to provide a tilting action around the fulcrum line locations 140, 142 and 144, 146 similar to that of the inner and outer intermediate rings 16 and 18 of the expansible connector 10 of FIGURES 1 and 2, and have flat inner and outer workpiece or machine element gripping surfaces 148 and 150, respectively.

In the operation of the expansible connector 100 of FIGURES 5 and 6, with the adjusting screws 126 loosened to relax the expanding action of the inner and outer intermediate flanged bars 120 and 122, the operator inserts the assembly 100 shown in FIGURE 6 into the rectangular space 102 between the upper surface 110 of the I-beam or I-rail 106 and the inner surface 108 of the channel member 104 as far as is desired. He then inserts a suitable wrench, such as an Allen wrench, successively into the sockets of the three adjusting screws 126 and rotates them clockwise, assuming them to posses right-handed threads, thereby drawing the forward and rearward bars 116 and 118 toward one another. This action causes a combined wedging and tilting action of the inner and outer flanged intermediate rings 120 and 122 in a manner similar to that explained above in connection with the double-acting expansible connector 10 of FIGURES 1 and 2. As a result of this double-acting wedging operation occurring between the coacting wedging surfaces 130, 136 and 132, 138 and the tilting action occurring between the inner and outer flanged intermediate bars 120 and 122 around their respective fulcrums, the gripping surfaces 140 and 142 of the inner and outer intermediate bars 120 and 122 are forced in opposite directions into firm engagement with the adjacent surfaces 110 and 108 of the beam 106 and channel member 104, respectively. This action interconnects the beam 106 and channel member 108 with a frictional grip which can be of any desired amount so as to cause either a predetermined slipping action or a positive locking action according to the adjustment of the adjusting screws 126.

What I claim is:
1. A double-acting expansible connector for joining a pair of spaced structural parts with a combined wedging and tilting action, said connector comprising
    an expanding device and an expanded device disposed adjacent one another and adapted to be disposed in the space between the parts to be joined and having a plurality of sets of aligned holes therethrough with the longitudinal axes of said sets of holes disposed in laterally spaced parallel relationship, and an elongated threaded element rotatably mounted in each set of said aligned holes and extending therethrough into threaded engagement with said expanding device, said devices having interengaging wedging surfaces inclined relatively to the axes of said threaded elements and responsive to the relative motion between said wedging surfaces by the rotation of said threaded elements for expanding said expanded device in a direction transverse to said axes of said threaded elements into gripping engagement with the spaced structural parts, said expanding device including axially spaced forward and rearward abutment elements and said expanded device including a plurality of pairs of relatively slidable and relatively tiltable interengaging intermediate inner and outer members of approximately L-shaped cross-section with substantially axially disposed flange portions and oblique web portions disposed at obtuse angles to their respective flange portions, and with the web portions of said inner and outer members being inclined at an obtuse angle relative to each other and to said expanding device so as to facilitate a combined tilting and wedging action between the inner and outer members of each pair and between each of said forward and rearward abutment elements and a respective one of said inner and outer members said L-shaped cross-section members having their flanges disposed in the same axial direction, the adjacent L-shaped cross-section members of each pair thereof being disposed in opposite directions with the free edges of the oblique web portions of each said pair sliding and tiltably engaging the opposing flange portions of each said pair of adjacent members, said oblique portions of said intermediate members containing said aligned holes.

2. An expansible connector, according to claim 1, wherein said expanding and expanded devices include annular flanged members with interengaging conical wedging surfaces thereon, certain of said annular flanged members having outer flanges with internal conical wedging surfaces thereon and others of said annular flange members having inner flanges with external conical wedging surfaces thereon, said outer-flanged and inner-flanged members being disposed in alternating engagement in an axial direction.

3. An expansible connector, according to claim 1, wherein said expanding and expanded devices include bars, each bar having a web and a flange on one edge of said web, said bars having inclined interengaging wedging surfaces on said flanges, said bars having their flanges disposed alternately above and below said aligned holes, the flanges of said bars being disposed at obtuse angles to the webs of said bars.

References Cited

UNITED STATES PATENTS

| | | | |
|---|---|---|---|
| 665,705 | 1/1901 | Summerer | 85—69 |
| 2,308,542 | 1/1953 | Raybould | 287—114 |
| 3,009,747 | 11/1961 | Pitzer. | |
| 3,168,338 | 2/1965 | Spieth. | |

CARL W. TOMLIN, *Primary Examiner.*

ANDREW KUNDRAT, *Assistant Examiner.*

U.S. Cl. X.R.

287—126